INVENTORS
WARREN E. BENSON, JR.
STANLEY BREEN
RALPH MONAGHAN

ATTORNEYS

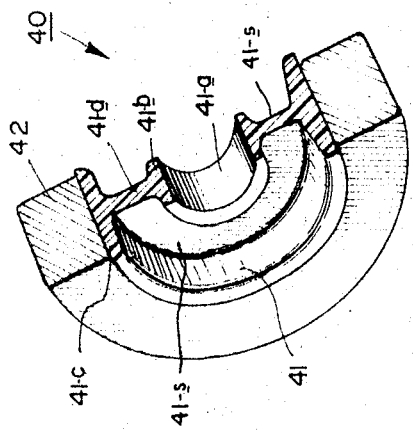
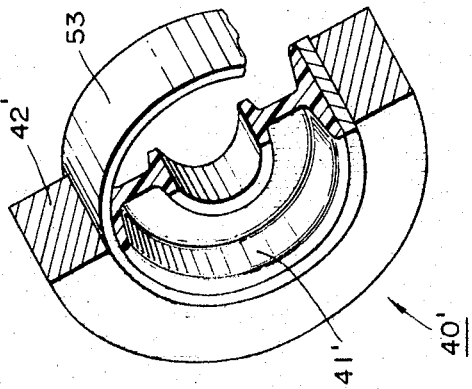
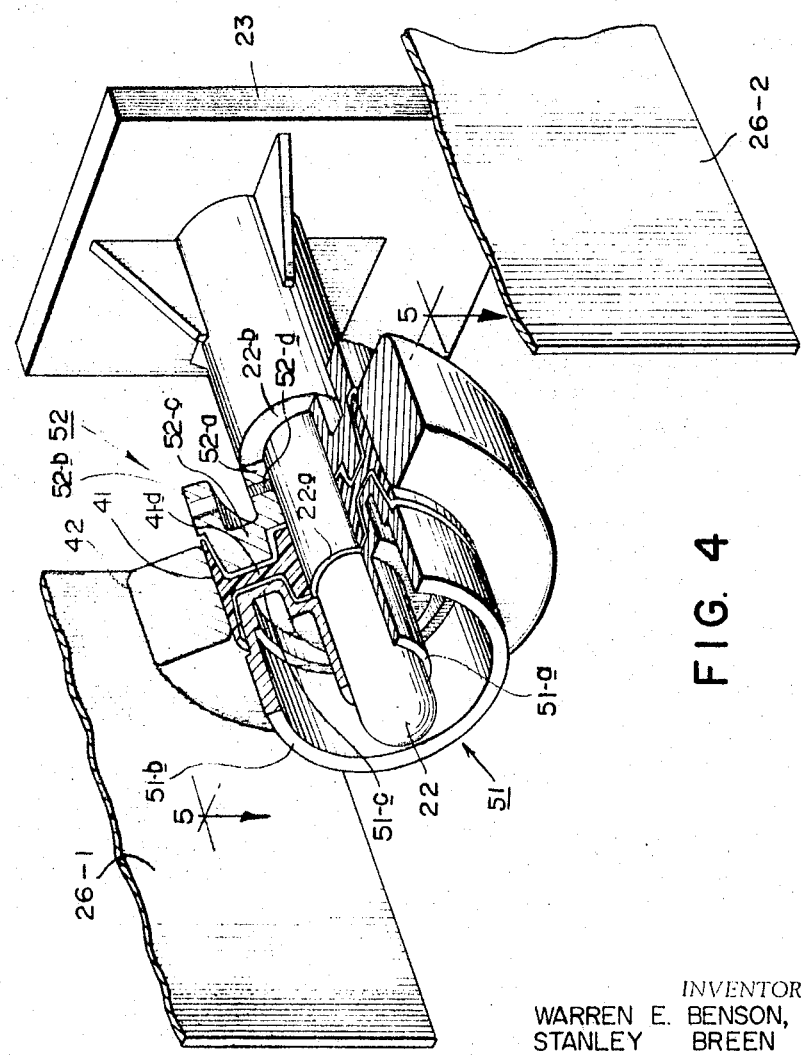

Sept. 2, 1969  W. E. BENSON, JR., ET AL  3,465,243
MEASUREMENT OF CAPACITIVITY OF MATERIALS UTILIZING A SHIELD
Filed Dec. 22, 1966  4 Sheets-Sheet 4

INVENTORS
WARREN E. BENSON, JR.
STANLEY BREEN
RALPH MONAGHAN
Dike, Thompson, & Bronstein

United States Patent Office 3,465,243
Patented Sept. 2, 1969

3,465,243
MEASUREMENT OF CAPACITIVITY OF
MATERIALS UTILIZING A SHIELD
Warren E. Benson, Jr., Needham, Stanley Breen, Norwood, and Ralph Monaghan, Medfield, Mass., assignors, by mesne assignments, to Kingsbury Technology Inc., Norwood, Mass., a corporation of Delaware
Filed Dec. 22, 1966, Ser. No. 603,820
Int. Cl. G01r 27/26
U.S. Cl. 324—61
15 Claims

ABSTRACT OF THE DISCLOSURE

An apparatus and method for determining the moisture content of a material supported on a support, such as a spool, of dielectric material, said system including means for establishing an electric field, means for holding in the field the support and material thereon and shielding for diverting the field around the support to reduce the passage of the field through the support.

This invention relates to the measurement of selected properties of materials, and, more particularly, to the capacitance measurement of such properties, notwithstanding undesirable dielectric effects.

In dealing with materials it is often necessary to measure such properties as moisture content, composition, density and the like. Moisture content, for example, influences both the physical and chemical behavior of materials. In a physical sense, moisture content contributes to the overall weight of materials and is therefore an important factor in determining their invoice value for shipping purposes. In a chemical sense, moisture content is a factor in process control.

To measure a selected property of materials, such as moisture content, an electrical energy field may be employed in conjunction with a test cell. In the case of an electrostatic field, the test cell consists of a capacitor and the capacitivity, including the dielectric constant of its dielectric medium, is altered by the introduction of materials under test. The change in dielectric constant attributable to the selected property of the test materials brings about a corresponding change in the capacitance of the test cell. The measured change in capacitance can be calibrated in terms of the selected property, such as moisture content.

To the extent that the measured change is attributable solely to the test materials, it accurately indicates the selected property. In many situations, however, it is difficult to prevent extraneous effects. These are often caused by accessory components associated with the test materials. Where the selected property is measured in terms of a change in capacitivity, the overall dielectric effect includes not only that of the materials but also that of the associated accessory components.

For example, during the manufacture of synthetic yarn, filamentary materials are wound upon spools which are commonly known as "formers." Each spool is typically of a dielectric material such as plastic. When it is desired to obtain a measure of the moisture content of the filamentary materials wound upon a spool, it is convenient to place the entire unit in a moisture analyzer taking the form of a capacitive test cell. The moisture content indication of the analyzer depends not only upon the dielectric effect of the filamentary materials wound upon the spool but also upon the dielectric effect of the spool itself. The latter effect can vary considerably from one spool to another.

Often the dielectric effect of a spool is negligible by comparison with the dielectric effect of the moisture in the filamentary materials under test. However, in the case of some materials, such as undrawn nylon, massive spools are employed for which variations in dielectric effect from one spool to another cannot be neglected. In such cases, the accuracy of measurement is seriously affected by variations in the dielectric effects of spools upon which filamentary materials are wound.

Although undesired dielectric effects can often be mitigated by employing spools of uniform construction, low-magnitude dielectric constant, and negligible mass effect, it is impractical in many cases to do so. Moreover, when a high degree of sensitivity is desired, adverse dielectric effects that are otherwise unobservable can introduce significant errors.

Accordingly, it is an object of the invention to make precision measurements of capacitivity. A related object is to reduce spurious effects attributable to collateral dielectric media associated with the materials under test.

A particular object of the invention is to promote the precision with which moisture content can be measured for filamentary materials wound upon spools. An associated object is to counter spurious dielectric effects associated with such spools.

Still another object of the invention is to promote precision measurement of selected properties of asymmetrically disposed materials.

In accomplishing the foregoing and related objects, the invention provides shielding which is disposed in the vicinity of materials under test to change the extent to which an electrical energy field would otherwise pass into the structure by which the test materials are supported.

For a support structure in the form of a spool holding filamentary materials, the shielding is of metal and is positioned to reduce the passage of a measurement electrostatic field through the spools. This reduces the effect that the spools have upon measurements of properties of the materials. In effect, the metallic shielding provides a short-circuiting action with respect to the spool.

According to one embodiment of the invention, the shielding is advantageously employed in conjunction with a capacitive test cell of a test cabinet. One such test cabinet is adapted to receive test materials between parallel plate electrodes straddling an interior measurement site. To reduce stray field effects with respect to external objects in the vicinity of an access to the measurement site, it is advantageous to dispose the capacitive test cell in conjunction with measurement circuitry so that an equipotential ground plane is established between its parallel plate electrodes.

The test materials introduced into the measurement site of the test cabinet are illustratively wound upon a dielectric spool which is inserted on a holder projecting outwardly from the rear of the cabinet. For this embodiment of the invention, the shielding is in the form of oppositely disposed metallic shields having convex surfaces which extend into the vicinity of concave side surfaces of the spool. A first, rearward shield is positioned upon the holder and is successively followed by the spool and by a second, forward shield. Thus, the shields provide a short-circuiting action with respect to a central, radial portion of the spool.

In accordance with one aspect of the invention, where two shields are employed with a dielectric spool, provision is made for fixing the distance of separation between them. For example, in the case of a holder in the form of a shaft, successively reduced diameters produce shoulders which establish respective stops for the rearward and forward shields. The stops assure a fixed distance of separation between the shields, resulting in a constant and reproducible shielding configuration.

In accordance with another aspect of the invention, the shields advantageously have cylindrical surfaces that extend longitudinally away from the dielectric spool with which they are used. This promotes uniformity of the resulting electrostatic field flux passing through the test materials, and thus reduces the measurement error that could exist in the case of asymmetrically disposed materials, such as asymmetrically wound filamentary materials.

For another embodiment of the invention the shielding is in the form of a metallic layer between the materials under test and the surface by which they are supported. In the case of a spool, the metallic layer is continuously disposed over the entire cylindrical support surface and thus provides a short-circuiting effect for the measurement field. The metallic layer may take the form of a sheet of foil between the support rim of the spool and test materials wound upon the spool. Alternatively, the metallic layer may take the form of a continuous metallic band upon the outer rim of the support spool. In the limiting case the entire support spool is of metal.

Other features of the invention will become apparent after considering several illustrative embodiments thereof, taken in conjunction with the drawings, in which:

FIG. 2 is a cross-sectional view of a test unit for the system of FIG. 1;

FIG. 4 is a perspective cross-sectional view of a test unit and associated internal shields within the measurement chamber of the system of FIG. 1;

FIG. 6 is a prespective cross-sectional view of an alternative, shielded test unit in accordance with the invention.

Figure 1:
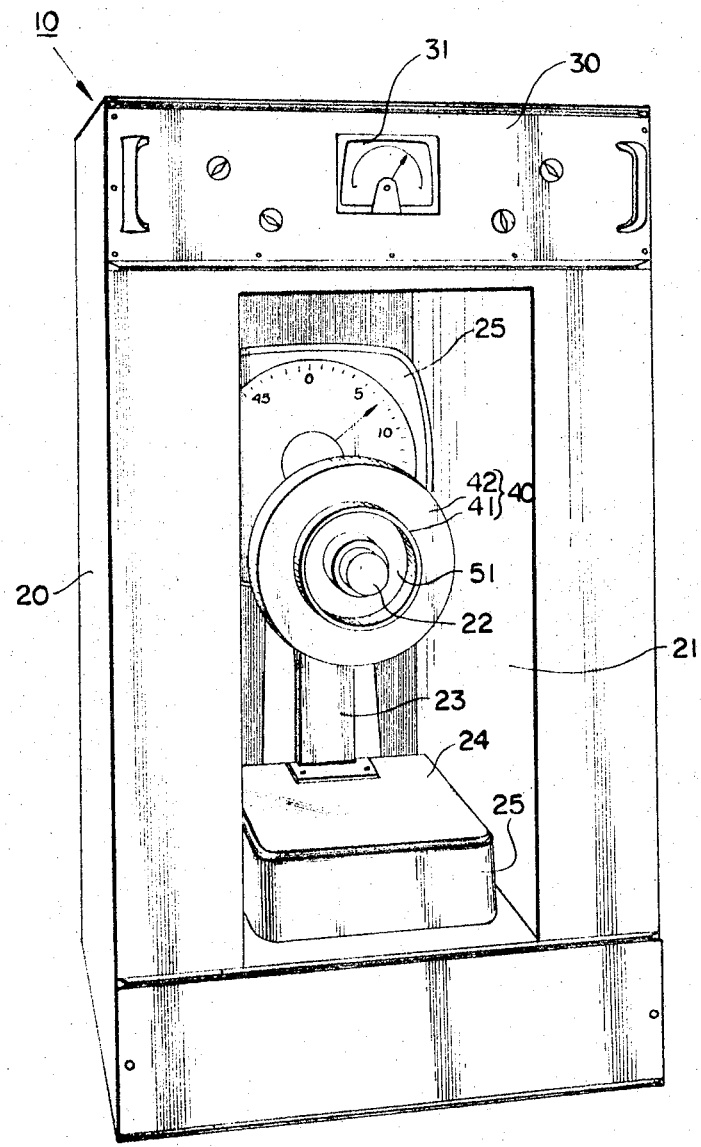
FIG. 1 is a perspective view of a measurement system in accordance with the invention.

Turning to FIG. 1, a representative measurement system 10 in accordance with the invention includes a test cabinet 20 with a measurement site 21 within which an electrical energy field is established by appropriate circuitry of an instrument case 30. For convenience, the instrument case 30 is mounted at the top of the cabinet 20. With the measurement site 21 occupied by a unit 40 that includes test materials, the electrical energy field in the vicinity of the unit 40 is controlled by internal shielding in accordance with the invention and a measure of a selected property of the test materials is indicated by a suitable meter 31.

In the particular embodiment of FIG. 1, an electrostatic field is established within the measurement site 21 between opposite plate electrodes (not shown) behind respective interior side panels of the cabinet 20. The measurement site 21 thus constitutes the interelectrode region of a capacitive test cell.

The capacitance of the test cell is governed in part by the dielectric constant, i.e., capacitivity of the medium between its electrodes. The capacitivity of the dielectric medium is changed by the introduction of the test unit 40, which in FIG. 1 illustratively includes a spool 41 that supports filamentary test materials 42. With this capacitance determining factors of the test cell, other than the capacitivity, substantially fixed, a measure of the change in capacitance indicated by the meter 31 provides a measure of the selected property under test, for example, the moisture content of the filamentary materials 42 wound upon the spool 41.

However, the resulting indication of the meter 31 can be adversely affected by spurious dielectric effects associated with the test unit 40, such as those of the spool 41. Accordingly, the invention provides for controlling the distribution of the electric field within the test unit 40, particularly the extent and variation of the field passing into the structure by which test materials are supported. This is accomplished by internal shielding, of which one constituent, a forward shield 51, is visible in FIG. 1. As a result, the indication of the meter 31 is largely attributable to the test materials and is not significantly affected by spurious dielectric effects of the support structure 41.

The test unit 40 of FIG. 1 is shown in greater detail by the cross-sectional view of FIG. 2. In a representative test unit, the support structure 41 is a spool of phenolic plastic and the test materials 42 are filaments of undrawn nylon. The particular support structure 41 of FIG. 2 takes the configuration of a solid of revolution with concave side surfaces 41–s which extend to concentric cylindrical surfaces. The outer cylindrical surface supports nylon yarn 42; while the inner cylindrical surface forms an aperture 41–a for positioning the spool 41 on a shaft or other suitable holder. In effect, the spool 41 has an inner cylinder-like portion 41–b that extends to an outer cylinder-like flange portion 41–c by a web portion 41–d of reduced thickness. The regions of joinder are rounded by fillets. In practice the spool 41 is a unitary structure which is of suitable dielectric material having sufficient strength for employment in manufacturing operations such as the winding of yarn. Once the yarn 42 has been wound upon the spool 41 it is advantageous to be able to measure the moisture content of the yarn without having to remove it from the spool.

Thus, the entire test unit 40, constituted of the spool 41 and the test materials 42, is positioned within the measurement region 21 of FIG. 1 on a holder 22 in the form of a rod or shaft. The holder 22 is attached to a vertical brace 23 mounted upon a weighing platform 24 of a scale 25 that is interiorly positioned within the measurement region 21.

The scale 25 gives an indication of the weight of the materials under test, with a measure of their moisture content being indicated by the meter 31 of the instrument case 30. For various weights and physical configurations of the test materials, calibration curves can be established which relate the selected property, e.g., moisture content, to both the graduations of the meter 31 and the weight of the test materials. Representative calibration curves are shown by FIG. 11 of U.S. Patent 3,012,193, issued to S. Breen on Dec. 5, 1961. Hence, using instrument graduations as one set of coordinates and weight as the other set of coordinates, a family of curves is established for various percentages of moisture content. The sensitivity of the meter 31, as well as the tuning of the circuitry by which the electrostatic field is established within the measurement region 21, is adjustable in conventional fashion by various control knobs associated with the instrument case 30.

Figure 3:
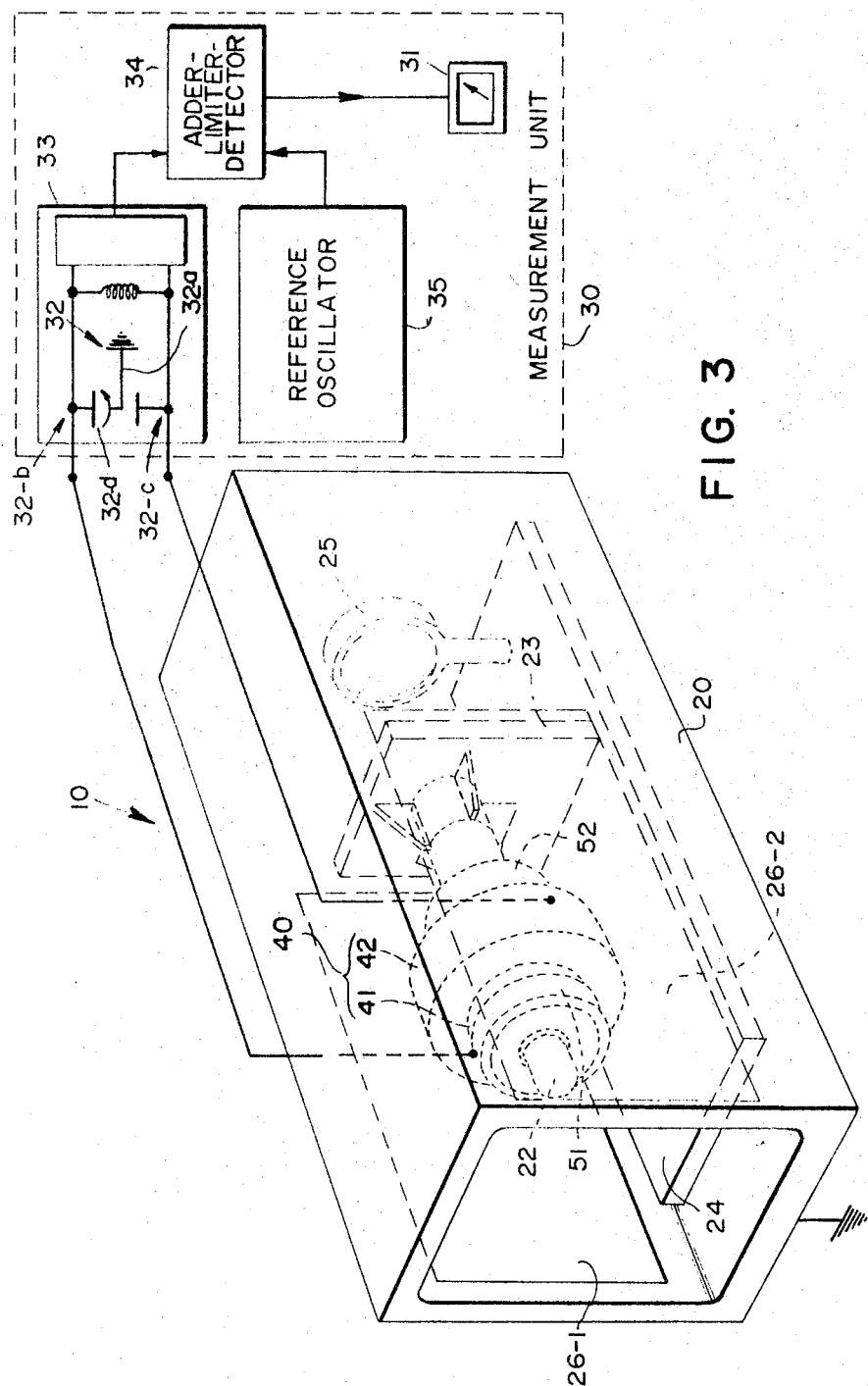
FIG. 3 is a schematic and block diagram of a representative implementation of the measurement system of FIG. 1.

A schematic view of one form of test cell for the cabinet 20, including the test unit 40 and internal shields 51 and 52, together with a block diagram of one form of circuitry for the instrument case 30, is given in FIG. 3.

Within the cabinet 20, and insulatingly spaced from its sidewalls, are vertically disposed plate electrodes 26–1 and 26–2. The insulation (not shown) between the plate electrodes 26–1 and 26–2, and their associated sidewalls, is desirably of uniform dielectric constant and may be of laminar plastic composition. The plate electrodes 26–1 and 26–2 are dimensioned such that the electric field extending between them, as established by the measurement circuitry of the instrument case 30, is appreciably uniform in the measurement region. Accordingly, the voltage distribution between the two plate electrodes 26–1 and 26–2 can be represented by equipotential planes that are parallel to the electrodes. The cabinet 20 acts as an external shield for the test cell and has a centrally disposed access in its front wall to permit placement of the test unit 40 at the measurement site.

For convenience in using the measurement system 10, it is desirable for the access to remain open, giving rise to the possibility of error-producing fringing field effects at the access with respect to external objects. Such fringing field effects are significantly curtailed by maintaining the voltage of the equipotential plane midway between the plate electrodes 26–1 and 26–2 at the same level as test cabinet 20, i.e., at ground level.

Suitable circuitry for establishing an equipotential ground plane between the plate electrodes 26–1 and 26–2 is disclosed in Patent 3,028,548, issued to S. Breen, on Apr. 3, 1962. In measurement circuitry of the kind described in the Breen patent and outlined in schematic and block diagram form in FIG. 3, the capacitance of the test cell within the chamber 20 affects the tank circuit 32 of a variable-frequency oscillator 33, which is otherwise of standard design. The tank circuit 32 is in two portions, with a common point 32–a grounded to the same potential level as the cabinet 20. The unground points 32–b and 32–c of the tank circuit 32 are respectively connected to the plate electrodes 26–1 and 26–2 of the test cabinet 20 and, during operation of the oscillator 33, are alternately above and below ground level. As a result, an equipotential ground plane, indicated by dashed lines 27 in FIG. 5, appears midway between the plate electrodes 26–1 and 26–2.

The output from the variable-frequency oscillator 33 is applied to an adder-limiter-detector 34, along with the output from a reference oscillator 35. With the test cell of the cabinet 20 empty, the system is tuned for a prescribed setting on the meter 31. In a representative tuning arrangement, a trimmer capacitor 32–d of the variable-frequency oscillator 33 is adjusted by one of the control knobs shown for the instrument case 30 in FIG. 1 so that the two oscillators 33 and 35 oscillate at a predetermined frequency-difference with the test cell empty, causing a predetermined output of the adder-limiter-detector 34. The corresponding indication on the meter 31 thus corresponds to the predetermined frequency-difference.

However, when the test unit 40 is placed upon the holder 22, the change in the capacitivity of the dielectric medium of the test cell changes the capacitance presented to the tank circuit 32 of the variable-frequency oscillator 33, thus changing the difference-frequency between the two oscillators 33 and 35 which is converted by the adder-limiter-detector 34 to produce an indication on the meter 31.

In the absence of the internal shields 51 and 52 shown positioned on respective sides of the test unit 40 in FIG. 3, the readings of the meter 31 for various test units may include an unpredictable error because of variations in the dielectric constant of their spool components.

Ordinarily, the spools are fabricated of materials which desirably have a negligible effect on the readings given by the meter 31. When this is not the case, the presence of the spool 41 in the test cell, unaccompanied by the internal shields 51 and 52, can introduced an appreciable error in the reading of the meter 31. In addition, when a high degree of sensitivity is desired, spurious dielectric effects of the spool, otherwise unobservable, can introduce significant error.

Details of the shields 51 and 52, and their placement with respect to the test unit 40 and the holder 22 are shown in FIG. 4 considering the shields 51 and 52 in the order in which they are placed upon the holder 22, the rearward shield 52 is positioned on the holder 22 against a rearward stop 22–b.

The rearward shield includes an inner sleeve 52–a, an outer sleeve 52–b and a generally convex connecting portion 52–c extending into the side of the spool 41 to the vicinity of its web 41–d. The inner sleeve 52–a engages the support 22, while the outer sleeve 52–b extends longitudinally away from the flanged portion 41–c of the spool 41 in the direction of the axis of the holder 22. This extended outer surface of the outer sleeve 52–b is advantageously knurled to facilitate handling when the rearward shield 52 is being positioned upon the holder 22. There is a void between the inner and outer sleeves 52–a and 52–b to reduce the overall weight of the shield 52 without reducing its effectiveness in controlling the electric field in its vicinity.

With the rearward shield 52 in place, the test unit is positioned on the holder 22, followed by the forward shield 51, which is similar in configuration and purpose to the rearward shield 52. The forward shield 51 has an inner sleeve 51–a, an outer sleeve 51–b and a generally convex region 51–c in the vicinity of the spool 41. As with the rearward shield 52, there is a weight reducing void between the inner sleeve 51–a and the outer sleeve 51–b. In addition, the outer surface of the outer sleeve 51–b is advantageously knurled to facilitate positioning the forward shield 51 in place against a forward stop 22–a of the holder 22.

Both the forward and rearward stops 22–a and 22–b of the holder 22 are formed by successive increases in diameter. This permits establishing a fixed distance between the forward and rearward shields 51 and 52, regardless of variations in the thickness of the web 41–d of the spool 41. The position of the rearward shield 52 against the rearward stop 22–b is fixed by the use of set screws in the inner sleeve 52–a, one of which 52–d is shown in FIG. 4.

Figure 5:
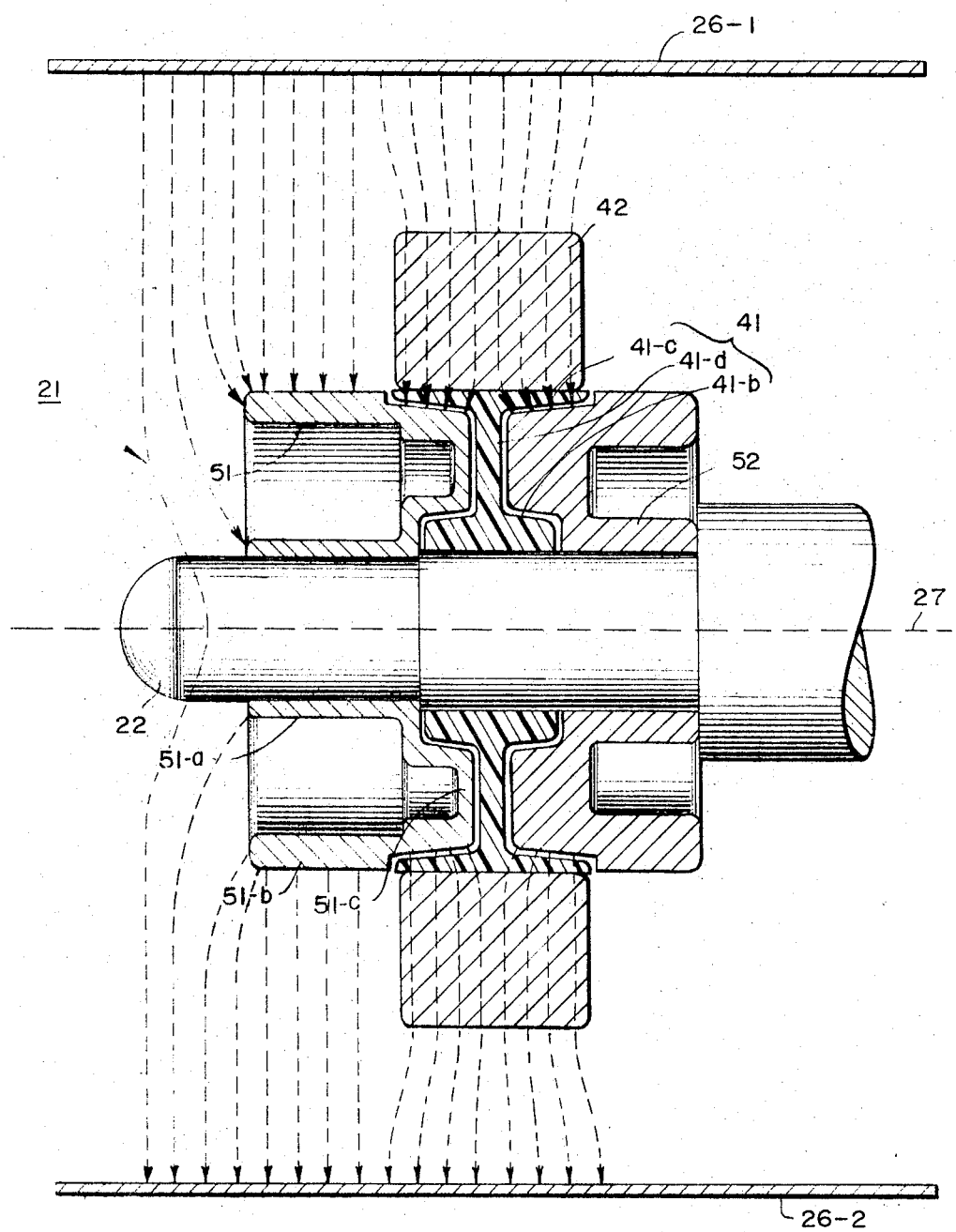
FIG. 5 is a horizontal sectional view taken on the lines 5—5 of FIG. 4 with the holder 22 unsectioned, illustrating the effect of the internal shields in the measurement system of FIG. 1.

One theory of the behavior of the forward and rearward shields 51 and 52 with respect to the test unit 40 is illustrated by FIG. 5. A hypothetical pattern of dashed lines of electric field flux is shown for the plane of section 5—5 (FIG. 4) for somewhat more than one-half of the electric field between the plate electrodes 26–1 and 26–2. For the purpose of illustration, the field pattern is shown at an instant when the upper plate electrode 26–1 of FIG. 5 is positive with respect to the lower plate electrode 26–2. Consequently, the ground plane 27 is also positive with respect to the lower plate electrode 26–2 at a potential level midway between the potential levels of the two electrodes 26–1 and 26–2. The flux lines originating at the positive electrode 26–1 may be considered as terminating on the ground plane 27 because of the disposition of the tank circuit 32 of FIG. 3 with respect to the test cabinet 20, and the flux lines terminating on the negative electrode 26–2 may be considered as originating at the ground plane 27. However, there are no flux lines inside the metal shields 51 and 52. In addition, there are no flux lines within the holder 22 where it is encircled by the shields because of their short-circuiting effect. It is to be understood that only a partial field pattern has been shown for simplicity. In practice, the lines of flux occupy the entire interelectrode region between the plate electrodes 26–1 and 26–2. If the shields 51 and 52 were omitted, electric field flux would not only pass through the test materials 42 but would also pass extensively through the web portion 41–d of the spool 41. Indeed, the higher the dielectric constant of the spool 41, the greater the flux passing through it. Because of the shields 51 and 52, which adjoin and project to the vicinity of the side surfaces of the web 41–d, the electric field entering the outer flange 41–c of the spool 41 tends to be diverted from the web 41–d and short-circuited, thus bypassing the web. As a result, the field which passes through the dielectric material of the spool 41 is of substantially zero magnitude through the hub and web and of substantially low magnitude through the remainder of the outer rim. Moreover, because of the relative proportions and disposition of the flange and web, the distance of travel through the dielectric material of the spool is less than would otherwise be the case, most of the mass of the spool being contained in the hub and web.

In addition, the extensions of the outer sleeves 51–b and 52–b of the shields 51 and 52 beyond the flange 41–c of the spool 41 tend to promote a uniform distribution of electric field flux in the material 42 under test, thus increasing the accuracy of measurement.

In a tested model of the invention the use of shields 51 and 52 was found to reduce the effects of significant nonuniformities from one spool to another to a negligible amount. Although the introduction of the shields decreased the sensitivity to moisture in the nylon yarn 42 to approximately 75% of the unshielded value, this reduction in sensitivity was readily compensated by an increase in the sensitivity of the measurement unit 30. In addition, the effects of asymmetric windings were substantially eliminated because of the action of the longitudinally extending cylindrical surfaces of the shields in promoting uniformity of electric field distribution in the filamentary materials under test.

In a particular model of the invention the shields 51 and 52 were of aluminum. The rearward shield 52 measured about three inches from front to rear. Its inner and outer diameters were approximately 5.7 and 7.5 inches for the outer sleeve 52–b and 2.6 and 3.5 inches for the inner sleeve 52–a. The length of the longitudinal extension was on the order of 1.5 inches and the void had a depth of about 2 inches. The forward shield 51 measured approximately 3.6 inches from front to rear. Its respective inner and outer diameters for the inner and outer sleeves 52–a and 52–b were about 2.5 and 7.5 inches. The forward shield 51 had a wall thickness of about 0.25 inch.

A further embodiment of the invention is shown in FIG. 6, for which a shield member 53 is incorporated as a part of a test unit 40'. For clarification the shield member 53 is shown in substantially complete perspective view, while the remainder of the test unit 40 'is in cross-sectional perspective view. The test unit 40' includes a support substructure 41' in the form of a spool of phenolic plastic. The shield member 53 is a continuous metal band disposed upon the outer rim of the support spool 41', and filamentary materials 42' of synthetic fiber are wound upon the outer surface of the shield member 53. When the test unit 40', incorporating the shield member 53, is positioned on the holder 22, in place of the test unit 40, the electrostatic measuring field which enters the filamentary materials 42' are short circuited by the shield member 53 with the result that substantially none of the measurement field passes into the spool substructure 41'. Consequently, a measurement made with the shielded test unit 40' is substantially uneffected by the dielectric effects of the spool 41'.

Alternatively, the shielding member 53 may take the form of a layer of metallic foil continuously disposed on the rim of the spool 41' between the rim and the filamentary test materials 42'. In the limiting case of a shield member 53 of the kind shown in FIG. 6, the entire spool is of metal, achieving the same result as a shielding band used with a spool substructure.

As noted earlier, both the test cell of the cabinet 20 and the measurement unit 30 are merely illustrative. The invention may be practiced using ordinary test cells, in which no equipotential ground plane 27 is established. Representative examples of such test cells, among others, are those disclosed in U.S. Patents 3,090,004, 3,025,465, 3,012,193 and 2,993,168.

The invention may also be employed with other measurement units for example, those in which a single oscillator is used, instead of the twin oscillator illustrated for the measurement unit 30 of FIG. 3. Suitable measuring units employing a single oscillator, as well as other variations of a twin oscillator system shown for the measurement unit 30, are disclosed in the copending application of Warren E. Benson, Jr., and Ralph F. Cragin, Ser. No. 579,278, filed Sept. 14, 1966.

Other modifications and adaptations of the invention will occur to those skilled in the art.

We claim:

1. The method of determining a property of a material positioned on a dielectric material support member which comprises generating an electrostatic flux field between spaced electrode surfaces, the space between said electrode surfaces forming a hollow measurement site, positioning within said measurement site said support member with said material thereon and shielding said support member to substantially reduce the passage of the electric flux field through said support member by diverting said field around at least a portion of said support member.

2. The method according to claim 1 including the step of measuring the capacity exhibited between the electrode surfaces.

3. The method according to claim 1 in which the support member is a spool around which the material is located and which is positioned in the measurement site with its axis substantially parallel to the electrode surfaces.

4. The method according to claim 3 in which the electric field is prevented from passing through the support member by the step of positioning shielding means on either side of said support member.

5. In a method of evaluating the moisture content of filamentary material wound upon a spool of dielectric plastic material or the like, said spool having a central radial portion, comprising the steps of generating an electrostatic flux field between spaced electrodes, the space between said electrodes forming a hollow measurement site, mounting the spool on a shaft in the measurement site to thereby support in said site the spool with the material thereon and placing metal shields on the shaft so that they are positioned axially on either side of said central radial portion of the spool to effectively prevent the passage of the electrostatic field through the central radial portion of the spool.

6. In the method according to claim 5 including the step of measuring the capacity between electrodes.

7. In a system for determining a property of a material positioned on a support constructed substantially of dielectric material, said system comprising test cell means for providing an electric field between a plurality of electrodes, holding means for holding the support with the material positioned thereon within the field so that the field will pass through said material and shielding means positioned to substantially reduce the passage of the electric field through said support when held within the field by the holding means by diverting said field around at least a portion of said support.

8. In a system according to claim 7, said material being located around said support.

9. In a system for determining the moisture content of a material supported on a spool constructed substantially of dielectric material and having means for supporting the spool within an electric field between spaced apart electrodes so that the field will pass through said material, the improvement characterized in that shielding is provided to substantially short circuit around the spool electric field flux lines which would pass through the spool in the absence of said shielding.

10. Apparatus responsive to capacity of substances and adapted to be coupled into an electrical measurement system, comprising spaced electrodes for generating an electric field therebetween, means mounting said electrodes in electrically insulated relationship with a hollow measurement site therebetween for accommodating quantities of said substances, a dielectric material support adapted to carry said substance, a holder for holding in said measurement site said support with said substance supported thereon and metallic shielding means positioned to divert said field around said support and substantially reduce the passage of the field through said support when said support is supported on said holder.

11. Apparatus according to claim 10 in which said holder comprises a shaft and wherein said shielding means comprises two members one of which is positioned on said shaft on either side of said support when said support is supported on said shaft.

12. Apparatus according to claim 11 in which said shaft includes stop means for locating said shielding members.

13. In an apparatus comprising means for establishing on electric field, means for positioning within said field a dielectric spool adapted to carry a material to be tested for a selected property thereof and controlling means positioned on the positioning means for controlling the passage of said field through said material and around said spool, said establishing means comprising a measurement chamber having a measurement site between a pair of insulatingly mounted capacitor electrodes, means for applying an electrical potential to said electrodes to establish an electrostatic field in said measurement site, the positioning means comprising a holder for mounting said dielectric spool in said chamber between said electrodes, said dielectric spool being in the form of a solid of revolution with side surfaces bounding an outer surface for supporting said material, and the controlling means comprising a first conductive shield member in the form of a surface of revolution and mounted upon said holder in mating disposition with one side surface of said dielectric spool, and a second conductive shield member, similar to the first mounted upon said holder and mated with the other side surface of said dielectric spool.

14. In an apparatus for use with a support for supporting test materials a selected property of which is to be determined by positioning said support and said materials supported thereby on a positioner disposed in an electric field, said apparatus comprising said positioner, means positionable on said positioner next to a side surface of said support for controlling the passage of said measurement field, said support having a flange for supporting said test materials and having means for engaging said positioner to removably mount said support on said positioner and a web extending between said flange and positioner engaging means, said controlling means comprising a first metallic portion disposed in the vicinity of the surface of said web when said controlling means is positioned on said shaft and a second metallic portion extending along an inner surface of said flange when said controlling means is positioned on said shaft, thereby to divert around said web electric field flux.

15. In an apparatus having a dielectric spool adapted to carry test materials a selected property of which is to be determined by positioning said spool and the materials supported thereby on a shaft disposed in an electric field, the invention characterized in that there is provided shielding means for controlling the passage of said measurement field, means for positioning said shielding means on said shaft next to a side surface of said support, said spool comprising an inner cylinder positionable on said shaft for positioning in the field said spool with said material thereon, an outer cylinder for supporting said materials and a radial web joining said inner cylinder with said outer cylinder, said web being of lesser longitudinal extent than either said inner cylinder or said outer cylinder, said shielding means comprising a first conductive sleeve for positioning said shielding means upon said shaft in the vicinity of said spool, a second conductive sleeve adjoining the outer cylinder of said spool when said shielding means is positioned upon said shaft, and a conductive portion joining said first conductive sleeve with said second conductive sleeve and positioned in the vicinity of the surface of said radial web when said shielding means is positioned upon said shaft.

References Cited
UNITED STATES PATENTS

| | | | |
|---|---|---|---|
| 3,028,548 | 4/1962 | Breen | 324—61 |
| 3,284,706 | 11/1966 | Benson | 324—61 |
| 3,297,945 | 1/1967 | Strandberg | 324—61 |
| 3,376,503 | 4/1968 | Lundstrom | 324—61 |

EDWARD E. KUBASIEWICZ, Primary Examiner